(12) United States Patent
Yoshioka et al.

(10) Patent No.: US 8,741,224 B2
(45) Date of Patent: Jun. 3, 2014

(54) ELECTRICALLY HEATED CATALYST

(75) Inventors: Mamoru Yoshioka, Susono (JP);
Yoshiharu Saito, Gotenba (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 50 days.

(21) Appl. No.: 13/515,374

(22) PCT Filed: Jan. 12, 2012

(86) PCT No.: PCT/JP2012/050482
§ 371 (c)(1),
(2), (4) Date: Jun. 12, 2012

(87) PCT Pub. No.: WO2013/105246
PCT Pub. Date: Jul. 18, 2013

(65) Prior Publication Data
US 2013/0183205 A1   Jul. 18, 2013

(51) Int. Cl.
*B01D 50/00* (2006.01)

(52) U.S. Cl.
USPC .............................. 422/179; 422/174; 422/176

(58) Field of Classification Search
CPC ... F01N 3/2006; F01N 3/2026; F01N 12/141; F01N 13/143; Y02T 10/26
USPC .......................... 422/177, 179, 180, 174, 176
See application file for complete search history.

(56) References Cited

U.S. PATENT DOCUMENTS

| | | | |
|---|---|---|---|
| 5,839,276 A | 11/1998 | Nishizawa | |
| 6,128,821 A * | 10/2000 | Grescher | 29/890 |
| 7,238,327 B2 * | 7/2007 | Irving et al. | 422/179 |
| 7,462,332 B2 * | 12/2008 | Hardesty et al. | 422/179 |
| 2005/0036923 A1 * | 2/2005 | Brisbin et al. | 422/179 |
| 2013/0011305 A1 | 1/2013 | Murata | |
| 2013/0022513 A1 | 1/2013 | Yoshioka | |

FOREIGN PATENT DOCUMENTS

| | | | |
|---|---|---|---|
| JP | 5 231140 | | 9/1993 |
| JP | 05269387 A | * | 10/1993 |
| JP | 8 210127 | | 8/1996 |

(Continued)

OTHER PUBLICATIONS

International Search Report issued Feb. 7, 2012 in PCT/JP12/50482 Filed Jan. 12, 2012.

*Primary Examiner* — Tom Duong
(74) *Attorney, Agent, or Firm* — Oblon, Spivak, McClelland, Maier & Neustadt, L.L.P.

(57) ABSTRACT

Electricity is suppressed from flowing through a case of an electrically heated catalyst. For this purpose, the case for accommodating a heat generating element includes a tubular portion which is formed in parallel to a central axis, an inlet portion which is provided on the upstream side from the tubular portion and which has an inner diameter smaller than that of the tubular portion, an inclined portion which connects the tubular portion and the inlet portion, and an introducing portion which extends from a connected portion between the inlet portion and the inclined portion toward inside of the case and which is curved so that a center of curvature is positioned at the outside; and an inner tube interposed by a mat for supporting the heat generating element includes a tubular portion which is formed in parallel to a central axis, and an inclined portion which is provided on the upstream side from the tubular portion, which has inner diameters that are decreased on the more upstream side, and which is curved.

5 Claims, 4 Drawing Sheets

(56) References Cited

FOREIGN PATENT DOCUMENTS

| | | |
|---|---|---|
| JP | 2008 14186 | 1/2008 |
| WO | 2011 121710 | 10/2011 |
| WO | 2011 128996 | 10/2011 |

\* cited by examiner

ELECTRICALLY HEATED CATALYST

TECHNICAL FIELD

The present invention relates to an electrically heated catalyst.

BACKGROUND ART

An electrically heated catalyst or electric heating catalyst (hereinafter referred to as "EHC" in some cases), in which the catalyst is heated by a heat generating element that generates the heat by applying the electricity, has been developed as an exhaust gas purification catalyst provided for an exhaust gas passage of an internal combustion engine.

The following technique is known. That is, a catalyst is supported by a mat in a case for accommodating the catalyst. An inner tube, which is an insulating member for electric insulation, is interposed by the mat to provide a double tube at the outside of the catalyst, and the inner tube is allowed to protrude toward the upstream side and the downstream side from the mat (see, for example, Patent Document 1).

Further, the following technique is known. That is, a case, which accommodates a catalyst, is allowed to have a tapered shape on the upstream side and the downstream side from the catalyst, and a double tube is formed, in which the upstream side is closed and the downstream side is open at a portion of the tapered shape (see, for example, Patent Document 2).

According to the double tube as described above, it is possible to secure the insulation performance to some extent even when condensed water and particulate matter (hereinafter referred to as "PM") adhere. However, it is feared that PM may adhere depending on the direction in which the exhaust gas flows. Therefore, it is feared that the insulation performance may be deteriorated. For this reason, it is feared that the electricity may flow through the case.

PRECEDING TECHNICAL DOCUMENTS

Patent Documents:
Patent Document 1: WO2011/121710;
Patent Document 2: WO2011/128996.

SUMMARY OF THE INVENTION

Task to be Solved by the Invention

The present invention has been made taking the foregoing problem into consideration, an object of which is to suppress the electricity from flowing through a case of an electrically heated catalyst.

Solution for the Task

In order to solve the problem as described above, the present invention resides in an electrically heated catalyst comprising:

a heat generating element which generates heat by applying electricity;

a case which accommodates the heat generating element;

a mat which is provided between the case and the heat generating element and which supports the heat generating element; and an inner tube which is interposed by the mat, which protrudes from the mat toward an upstream side and a downstream side of a flow of exhaust gas, and which insulates the electricity, wherein:

the case includes a tubular portion which is provided on an outer circumferential side of the heat generating element and which is formed in parallel to a central axis of the heat generating element, an inlet portion which is provided on the upstream side from the tubular portion and which has an inner diameter smaller than that of the tubular portion, an inclined portion which connects the tubular portion and the inlet portion and which has cross-sectional areas that are increased on the more downstream side, and an introducing portion which extends from a connected portion between the inlet portion and the inclined portion toward inside of the case;

the introducing portion is curved so that a center of curvature is positioned outside the introducing portion;

the inner tube includes a tubular portion which is provided on an outer circumferential side of the heat generating element and which is formed in parallel to a central axis of the heat generating element, and an inclined portion which is provided on the upstream side from the tubular portion and which has inner diameters that are decreased on the more upstream side; and the inclined portion of the inner tube is curved.

The heat generating element may be a carrier for the catalyst, and the heat generating element may be provided on the upstream side from the catalyst. The heat generating element generates the heat by applying the electricity to the heat generating element, and hence it is possible to raise the temperature of the catalyst. Further, the mat is short in the flow direction of the exhaust gas as compared with the inner tube. Therefore, the inner tube protrudes from the inner mat and the outer mat toward the upstream side and the downstream side in the flow direction of the exhaust gas. The case may be an outer tube of a double tube. That is, a double tube may be formed by the case and the inner tube. The mat is provided at the inside of the tubular portion of the case, and the mat interposes the tubular portion of the inner tube. In this arrangement, the inclined portion of the inner tube and the inclined portion of the case may be parallel to one another.

Owing to the introducing portion provided for the case, the exhaust gas is suppressed from being diffused toward the space between the inner tube and the case. Therefore, the exhaust gas is suppressed from flowing into the space between the case and the inner tube. Further, the introducing portion is bent toward the outside of the introducing portion. The outside, which is referred to herein, is the side on which the position is separated from the central axis. That is, as for the introducing portion, the distance from the central axis is longer on the more downstream side, and hence the cross-sectional area is more increased on the more downstream side. Therefore, the exhaust gas advances while spreading toward the outside until the exhaust gas arrives at the heat generating element after the exhaust gas passes through the introducing portion. Therefore, it is possible to allow the exhaust gas to flow more uniformly in a wide range of the heat generating element. Further, it is thereby possible to decrease the amount the exhaust gas which collides with the upstream side end portion of the heat generating element to cause the counterflow.

In this arrangement, a part of the exhaust gas collides with the upstream side end portion of the heat generating element to cause the counterflow. That is, a part of the exhaust gas intends to advance toward the upstream side. However, the inclined portion of the inner tube exists, and hence the exhaust gas advances toward the upstream side and toward the central axis side along the inclined portion of the inner tube. The exhaust gas, which causes the counterflow, is pushed back by the exhaust gas which newly inflows from the introducing portion, and the direction of the exhaust gas is changed toward the downstream side. Therefore, any turbulence or vortex is formed by the exhaust gas between the heat generating element and the inclined portion of the inner tube. If the turbulence or vortex is enlarged, then the exhaust gas flows into the space between the case and the inner tube, and PM tends to adhere. On the contrary, owing to the provision of the introducing portion, the amount of the counterflow exhaust gas is decreased. Therefore, it is possible to suppress the inflow of the exhaust gas into the space between the case and the inner tube. Therefore, it is possible to suppress the adhesion of PM between the inner tube and the case, and hence it is possible to suppress the decrease in the insulation performance.

Owing to the bent or curved inclined portion of the inner tube, it is possible to further suppress the exhaust gas from flowing into the space between the inner tube and the case. Accordingly, it is possible to suppress the adhesion of PM between the inner tube and the case, and hence it is possible to suppress the decrease in the insulation performance. In this way, it is possible to suppress the electricity from flowing between the heat generating element and the case.

In the present invention, it is preferable that the inclined portion of the inner tube is curved so that a center of curvature is positioned outside the inclined portion.

That is, it is preferable that the inclined portion of the inner tube approaches the case more closely on the more upstream side. Accordingly, the exhaust gas, which flows from the downstream side end portion of the introducing portion, can be suppressed from flowing into the space between the inner tube and the case via the space between the case and the upstream side end portion of the inclined portion of the inner tube. Further, the exhaust gas, which causes the counterflow from the side of the heat generating element, can be introduced into the inside of the inclined portion of the case at the outside of the introducing portion on the upstream side from the inner tube, and the turbulence or vortex can be formed. Accordingly, it is also possible to suppress the exhaust gas from flowing into the space between the inner tube and the case. Therefore, it is possible to suppress the adhesion of PM between the inner tube and the case. Therefore, it is possible to suppress the electricity from flowing through PM.

In this arrangement, an upstream side end portion of the inclined portion of the inner tube can be positioned outside a tangential line provided at a downstream side end portion of the introducing portion.

The exhaust gas flows in the tangential line direction of the downstream side end portion of the introducing portion. Therefore, when the upstream side end portion of the inclined portion of the inner tube is positioned outside the tangential line, the upstream side end portion of the inclined portion of the inner tube is positioned outside the flow of the exhaust gas. Therefore, it is possible to suppress the exhaust gas from passing through the space between the case and the upstream side end portion of the inclined portion of the inner tube and flowing into the space between the inner tube and the case.

In the present invention, it is preferable that the inclined portion of the inner tube is curved so that a center of curvature is positioned inside the inclined portion.

That is, it is preferable that the inclined portion of the inner tube is separated farther from the case at positions nearer to the end portion. Accordingly, the exhaust gas, which causes the counterflow from the side of the heat generating element, advances along the inner side of the inclined portion of the inner tube, and thus the exhaust gas advances in the direction to make separation from the case. Therefore, it is possible to suppress the exhaust gas from flowing into the space between the inner tube and the case. Accordingly, it is possible to suppress the adhesion of PM between the inner tube and the case, and hence it is possible to suppress the electricity from flowing through PM.

In this arrangement, an end portion of the inclined portion of the inner tube can be positioned outside a line which connects a downstream side end portion of the introducing portion and an outer circumference of the mat provided inside the inner tube.

Accordingly, the exhaust gas, which flows from the downstream side end portion of the introducing portion, can be suppressed from directly flowing into the space between the inner tube and the case. The introducing portion may be formed so that the exhaust gas, which flows into the case from the downstream side end portion of the introducing portion along the wall surface of the introducing portion, advances toward the outer circumference of the heat generating element or the outer circumference of the mat provided inside the inner tube. Further, an end portion of the inclined portion of the inner tube may be positioned outside a line which connects a downstream side end portion of the introducing portion and an outer circumference of an upstream side end surface of the heat generating element.

Effect of the Invention

According to the present invention, it is possible to suppress the electricity from flowing through the case of the electrically heated catalyst.

MODE FOR CARRYING OUT THE INVENTION

A specified embodiment of the electrically heated catalyst according to the present invention will be explained below on the basis of the drawings.

First Embodiment

Figure 1:
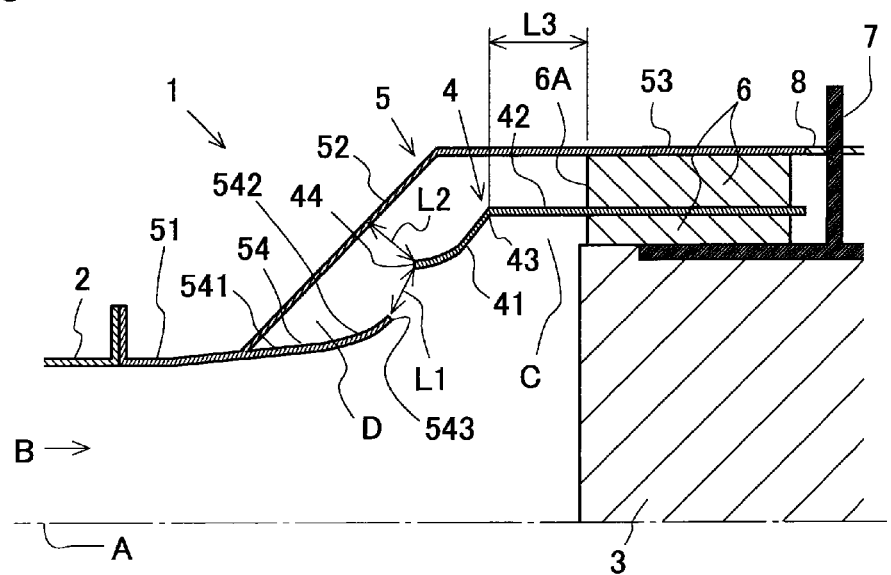
FIG. 1 shows a schematic arrangement of an electrically heated catalyst according to a first embodiment.

FIG. 1 shows a schematic arrangement of an electrically heated catalyst 1 (hereinafter referred to as "EHC 1") according to this embodiment. EHC 1 according to this embodiment is provided for an exhaust tube 2 of an internal combustion engine carried on a vehicle. The internal combustion engine may be either a diesel engine or a gasoline engine. EHC 1 can be also used for a vehicle which adopts the hybrid system provided with an electric motor.

EHC 1 shown in FIG. 1 is depicted in a cross-sectional view in which EHC 1 is cut or sectioned in the vertical direction along the central axis A of EHC 1. The shape of EHC 1 is linearly symmetric in relation to the central axis A. Therefore, only an upper part is shown in FIG. 1. The shape of EHC 1 on the downstream side may be a symmetric shape with respect to the shape on the upstream side, or it may be the same shape as that adopted conventionally. Therefore, the shape of EHC 1 on the downstream side is omitted from the illustration. The arrow B shown in FIG. 1 indicates the flow direction of the exhaust gas.

EHC 1 according to this embodiment is provided with a catalyst carrier 3 which has a columnar shape about the center of the central axis A. The catalyst carrier 3, an inner tube 4, and a case 5 are provided in this order as referred to from the side of the central axis A. A mat 6 is provided between the catalyst carrier 3 and the inner tube 4 and between the inner tube 4 and the case 5.

A material, which serves as an electric resistor and which generates the heat by applying the electricity, is used for the catalyst carrier 3. For example, SiC is used as the material for the catalyst carrier 3. The catalyst carrier 3 has a plurality of passages which extend in the flow direction B of the exhaust gas (the direction may be the direction of the central axis A as well) and which provide a honeycomb shape formed by a cross section perpendicular to the direction in which the exhaust gas flows. The exhaust gas flows through the passages. The outer shape of the catalyst carrier 3 is, for example, a columnar shape about the center of the central axis A of the exhaust tube 2. The cross-sectional shape of the catalyst carrier 3, which is provided in relation to the cross section perpendicular to the central axis A, is, for example, either an elliptic shape or a polygonal shape. The central axis A is the common central axis common to the exhaust tube 2, the catalyst carrier 3, the inner tube 4, and the case 5. In this embodiment, the catalyst carrier 3 corresponds to the heat generating element according to the present invention. This embodiment can be also equivalently applied to a heat generating element provided when the heat generating element is disposed on the upstream side from any catalyst.

A catalyst is carried on the catalyst carrier 3. The catalyst can be exemplified, for example, by an oxidation catalyst, a three way catalyst, an absorption reduction type NOx catalyst, and a selective reduction type NOx catalyst. A pair of electrodes 7 are connected to the catalyst carrier 3. The electric power is applied to the catalyst carrier 3 by applying the voltage between the electrodes 7. The catalyst carrier 3 generates the heat by means of the electric resistance of the catalyst carrier 3.

An electric insulator, which is, for example, alumina, can be used as the material for the inner tube 4. Alternatively, the inner tube 4 may be provided by coating a surface of an electric conductor such as a metal or the like with an electric insulator. The inner tube 4 is constructed to include an inclined portion 41 and a tubular portion 42 provided in this order from the upstream side. The inclined portion 41 is inclined with respect to the central axis A so that the inner diameter is decreased on the more upstream side. The upstream side end portion 44 of the inclined portion 41 is open. The exhaust gas flows into the inside of the inner tube 4 from the upstream side end portion 44. The downstream side end portion of the inclined portion 41 is connected to the upstream side end portion of the tubular portion 42. The boundary between the inclined portion 41 and the tubular portion 42 is the portion at which the inner tube 4 is bent and folded, which is hereinafter referred to as "bent portion 43".

The portion, which is disposed in the vicinity of the upstream side end portion 44 of the inclined portion 41 of the inner tube 41, is curved so that the center of curvature exists outside the inner tube 4. That is, the cross-sectional area of the inclined portion 41 is gradually decreased on the upstream side from the bent portion 43. However, the degree or rate of decrease in the cross-sectional area is decreased at positions disposed on the more upstream side in the vicinity of the upstream side end portion 44. This situation is also expressed such that the curvature is provided toward the outside of the inner tube 4. Further, this situation is also expressed such that the inclination of the tangential line of the inclined portion 41 of the inner tube 4 is decreased on the more upstream side. In this way, the inclined portion 41 of the inner tube 4 approaches the case 5 more closely on the more upstream side. In the vicinity of the bent portion 43, the inclined portion 41 may have cross-sectional areas which are decreased at a certain degree or rate at positions disposed on the more upstream side. Further, the degree or rate of decrease in the cross-sectional area may be decreased at positions disposed on the more upstream side, in the same manner as in the vicinity of the upstream side end portion 44.

The tubular portion 42 is formed to have a tubular shape about the center of the central axis A. The tubular portion 42 is composed of a curved surface which is parallel to the central axis A. The tubular portion 42 may be divided into one disposed on the upstream side from the electrodes 7 and one disposed on the downstream side from the electrodes 7. A certain extent of spacing distance is provided between the electrodes 7 and the tubular portion 42 so that any electric discharge is not caused.

A metal is used as a material for the case 5. For example, it is possible to use a stainless steel material. The case 5 may be an outer tube of a double tube. A hole is bored through the case 5 in order to allow the electrodes 7 to pass therethrough. A certain extent of spacing distance is provided between the case 5 and the electrodes 7 so that any electric discharge is not caused. An insulating portion 8 for supporting the electrodes 7 is provided in the hole bored through the case 5. An electric insulator is used as a material for the insulating portion 8. The insulating portion 8 is provided without forming any gap between the case 5 and the electrodes 7.

The case 5 is constructed to include an inlet portion 51, an inclined portion 52, and a tubular portion 53 provided in this order from the upstream side. The inclined portion 52 is inclined with respect to the central axis A so that the inner diameter is increased on the more downstream side. The upstream side end portion of the inclined portion 52 is connected to the inlet portion 51. A flange is formed at the upstream side end portion of the inlet portion 51 of the case 5, which is connected to the exhaust tube 2. The inlet portion 51 is open. The exhaust gas flows into the inside of the case 5 via the inlet portion 51. The downstream side end portion of the inclined portion 52 of the case 5 is connected to the upstream side end portion of the tubular portion 53. The inclined portion 52 of the case 5 may be parallel to the portion which is a part of the inclined portion 41 of the inner tube 4 and which is disposed in the vicinity of the bent portion 43.

The tubular portion 53 of the case 5 is formed to have a tubular shape about the center of the central axis A. The tubular portion 53 of the case 5 is composed of a curved surface which is parallel to the central axis A.

An introducing portion 54, which extends toward the downstream side, is connected to the connected portion between the inlet portion 51 of the case 5 and the inclined portion 52 of the case 5. The introducing portion 54 is composed of an inclined portion 541 which is disposed on the upstream side and a curved portion 542 which is disposed on the downstream side.

The inclined portion 541 of the introducing portion 54 is inclined with respect to the central axis A so that the cross-sectional area is increased on the more downstream side. As for the inclined portion 541 of the introducing portion 54, the cross-sectional area is increased at a certain rate at positions disposed on the more downstream side. In this embodiment, the inclination starts from an intermediate position of the inlet portion 51. In place thereof, it is also allowable that the inclination starts from the upstream side end portion of the introducing portion 54.

On the other hand, the curved portion 542 of the introducing portion 54 is curved so that the center of curvature exists outside the introducing portion 54. That is, the cross-sectional area of the curved portion 542 of the introducing portion 54 is gradually enlarged at positions disposed on the more downstream side. However, the degree or rate of increase in the cross-sectional area is increased at positions disposed on the more downstream side. This situation is also expressed such that the introducing portion 54 is curved toward the outside. Further, this situation is also expressed such that the inclination of the tangential line of the introducing portion 54 is increased on the more downstream side.

Further, the introducing portion 54 and the inclined portion 41 of the inner tube 4 are formed so that the upstream side end portion 44 of the inclined portion 41 of the inner tube 4 is positioned outside the tangential line of the downstream side end portion 543 of the introducing portion 54. That is, when the exhaust gas advances in the tangential line direction from the downstream side end portion 543 of the introducing portion 54, the exhaust gas is allowed to flow at positions deviated toward the central axis A as compared with the upstream side end portion 44 of the inclined portion 41 of the inner tube 4. The distance L1, which is provided between the downstream side end portion 543 of the introducing portion 54 and the inclined portion 41 of the inner tube 4, is set as the distance capable of suppressing the occurrence of the electric discharge when the electric power is applied to the catalyst carrier 3. Similarly, the distance L2, which is provided between the inclined portion 52 of the case 5 and the inclined portion 41 of the inner tube 4, is set as the distance capable of suppressing the occurrence of the electric discharge when the electric power is applied to the catalyst carrier 3. The distances L1, L2 can be obtained, for example, by means of an experiment.

An electric insulator is used for the mat 6. For example, a ceramic fiber, which contains a main component of alumina, is used. The mat 6 is wound around the outer circumferential surface of the catalyst carrier 3 and the outer circumferential surface of the tubular portion 42 of the inner tube 4. The mat 6 covers the outer circumferential surface (curved surface parallel to the central axis A) of the catalyst carrier 3. Therefore, when the electricity is applied to the catalyst carrier 3, the electricity is suppressed from flowing to the inner tube 4 and the case 5.

The mat 6 is provided between the tubular portion 42 of the inner tube 4 and the catalyst carrier 3 and between the tubular portion 53 of the case 5 and the tubular portion 42 of the inner tube 4.

The outer diameter of the mat 6, which is brought about when the mat 6 is wound around the catalyst carrier 3, is larger than the inner diameter of the inner tube 4. Therefore, when the mat 6 is accommodated in the inner tube 4, the mat 6 is compressed. Therefore, the catalyst carrier 3 is fixed in the inner tube 4 by means of the repulsive force of the mat 6.

Further, the outer diameter of the mat 6, which is brought about when the mat 6 is wound around the inner tube 4, is larger than the inner diameter of the case 5. Therefore, when the mat 6 is accommodated in the case 5, the mat 6 is compressed. Therefore, the inner tube 4 is fixed in the case 5 by means of the repulsive force of the mat 6. The inner tube 4 protrudes toward the upstream side and the downstream side from the mat 6.

This embodiment is explained assuming that the mat 6 is divided into one disposed on the upstream side from the electrodes 7 and one disposed on the downstream side from the electrodes 7. However, the divided ones may be integrated into one unit in relation to the upstream side and the downstream side at portions other than those disposed around the electrodes 7.

Figure 2:
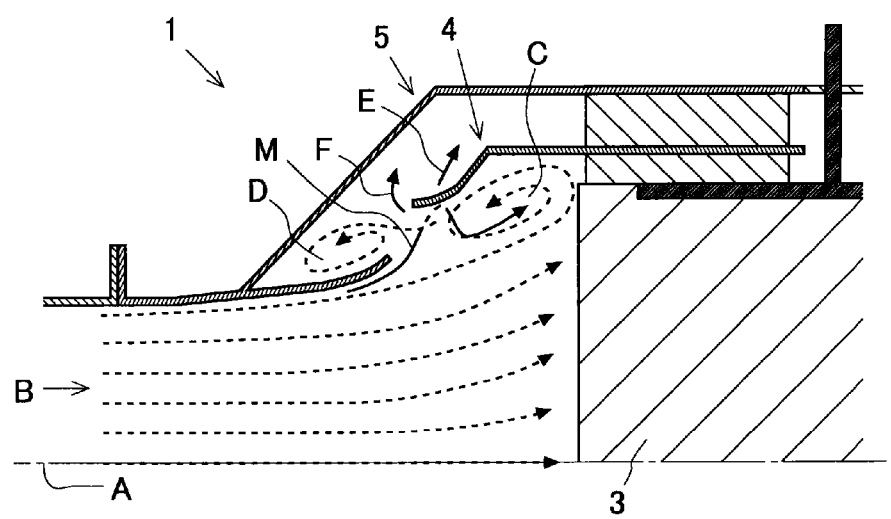
FIG. 2 shows the flow of exhaust gas according to the first embodiment.

In this embodiment, the cross-sectional area of the introducing portion 54 is increased at positions disposed on the more downstream side. Therefore, the exhaust gas can be diffused in a wide range. Accordingly, the exhaust gas flows into the catalyst carrier 3 uniformly. As shown in FIG. 2, the turbulence or vortex, which is generated on the upstream side from the catalyst carrier 3, can be reduced. FIG. 2 shows the flow of the exhaust gas according to this embodiment. The flow direction of the exhaust gas is indicated by the broken line arrows or the alternate long and two short dashes line arrow.

A part of the exhaust gas, which inflows from the introducing portion 54, collides with the upstream side end surface of the catalyst carrier 3, and it flows toward the outer circumferential side of the catalyst carrier 3 along the upstream side end surface of the catalyst carrier 3. The exhaust gas collides with the tubular portion 42 of the inner tube 4, and then the exhaust gas causes the counterflow toward the upstream side along the inner tube 4. The inclined portion 41 of the inner tube 4 is inclined toward the central axis A. Therefore, the exhaust gas advances toward the upstream side and toward the central axis A. After that, the exhaust gas is pushed back by the exhaust gas which is newly introduced from the introducing portion 54. Accordingly, the exhaust gas forms the turbulence or vortex in the space C disposed between the catalyst carrier 3 and the inclined portion 41 of the inner tube 4.

If the cross-sectional area of the introducing portion 54 is constant over a range to the downstream side end portion 543, then a large amount of the exhaust gas collides with the portions of the catalyst carrier 3 disposed in the vicinity of the central axis of the catalyst carrier 3, and hence the amount of the exhaust gas, which advances along the upstream side end surface of the catalyst carrier 3, is increased. As a result, a large turbulence or vortex is generated in the space C disposed between the catalyst carrier 3 and the inclined portion 41 of the inner tube 4. On the other hand, when the cross-sectional area of the introducing portion 54 is increased at positions disposed on the more downstream side as in this embodiment, then the exhaust gas is dispersed in a wide range, and hence the generated turbulence or vortex is small.

In this arrangement, the exhaust gas flows into the space between the case 5 and the inner tube 4 more easily as the turbulence or vortex, which is generated in the space C disposed between catalyst carrier 3 and the inclined portion 41 of the inner tube 4, is larger. Therefore, it is possible to decrease the amount of the exhaust gas allowed to flow into the space between the inner tube 4 and the case 5 by decreasing the turbulence or vortex generated in the space C between the catalyst carrier 3 and the inclined portion 41 of the inner tube 4. Accordingly, it is possible to suppress the adhesion of PM between the inner tube 4 and the case 5.

The upstream side end portion 44 of the inner tube 4 is positioned outside the tangential line provided at the downstream side end portion 543 of the introducing portion 54. Therefore, the exhaust gas, which advances from the introducing portion 54 to the inclined portion 41 of the inner tube 4, collides with the inner wall surface of the inclined portion 41 of the inner tube 4 as indicated by the alternate long and two short dashes line M. The exhaust gas subsequently flows to the space C disposed between the catalyst carrier 3 and the inclined portion 41 of the inner tube 4. That is, it is possible to suppress the exhaust gas from flowing in the direction indicated by E.

The portion, which is disposed in the vicinity of the upstream side end portion 44 of the inner tube 4, is bent toward the inclined portion 52 of the case 5. Therefore, the distance L2, which is provided between the upstream side end portion 44 of the inner tube 4 and the inclined portion 52 of the case 5, is relatively short. Accordingly, the exhaust gas also hardly flows into the space between the inner tube 4 and the case 5. Further, a part of the exhaust gas, which collides with the catalyst carrier 3 to cause the counterflow, advances along the inner wall of the inclined portion 41 of the inner tube 4. Accordingly, the exhaust gas can be introduced into the space D disposed between the introducing portion 54 and the inclined portion 52 of the case 5. That is, it is possible to suppress the exhaust gas from flowing in the direction indicated by F. The turbulence or vortex of the exhaust gas can be generated in the space D. Therefore, it is possible to suppress the exhaust gas from flowing into the space between the inner tube 4 and the case 5.

In this embodiment, the upstream side end portion 6A of the mat 6 may be separated from the bent portion 43 by a predetermined distance L3. That is, the outer circumferential surface of the tubular portion 42 of the inner tube 4 may be exposed on the upstream side from the upstream side end portion 6A of the mat 6.

In this arrangement, the exhaust gas, which flows into the space between the inner tube 4 and the case 5, flows along the inclined portion 41. The exhaust gas also intends to advance in the direction of the extension line of the inclined portion 41 at the bent portion 43. Therefore, the flow of the exhaust gas is separated from the outer circumferential surface of the tubular portion 42 of the inner tube 4. Accordingly, the exhaust gas does not directly abut against the outer circumferential surface of the tubular portion 42 of the inner tube 4 disposed on the upstream side from the upstream side end portion 6A of the mat 6 on the downstream side from the bent portion 43. In this way, PM hardly adheres to the concerning portion owing to the fact that the exhaust gas does not directly abut thereagainst. That is, the upstream side end portion 6A of the mat 6 is separated from the bent portion 43 by the predetermined distance L3, and thus it is possible suppress the adhesion of PM to the outer circumferential surface of the inner tube 4 disposed therebetween. The predetermined distance L3 is, for example, such a distance that the creeping discharge between the bent portion 43 and the upstream side end portion 6A of the mat 6 can be suppressed. It is also appropriate that an optimum value is determined, for example, by means of an experiment.

Even when PM adheres to the inclined portion 41 of the inner tube 4, it is possible to suppress the electricity from flowing via PM between the catalyst carrier 3 and the case 5, on condition that PM does not adhere to the outer circumferential surface of the tubular portion 42 of the inner tube 4. That is, at least the surface of the inner tube 4 is the electric insulator. Therefore, the electricity does not flow on condition that PM does not adhere.

As explained above, in this embodiment, it is possible to decrease the amount of the exhaust gas allowed to flow between the inner tube 4 and the case 5. Therefore, it is possible to suppress the adhesion of PM between the inner tube 4 and the case 5. Accordingly, it is possible to suppress the electricity from flowing via PM.

Second Embodiment

Figure 3:
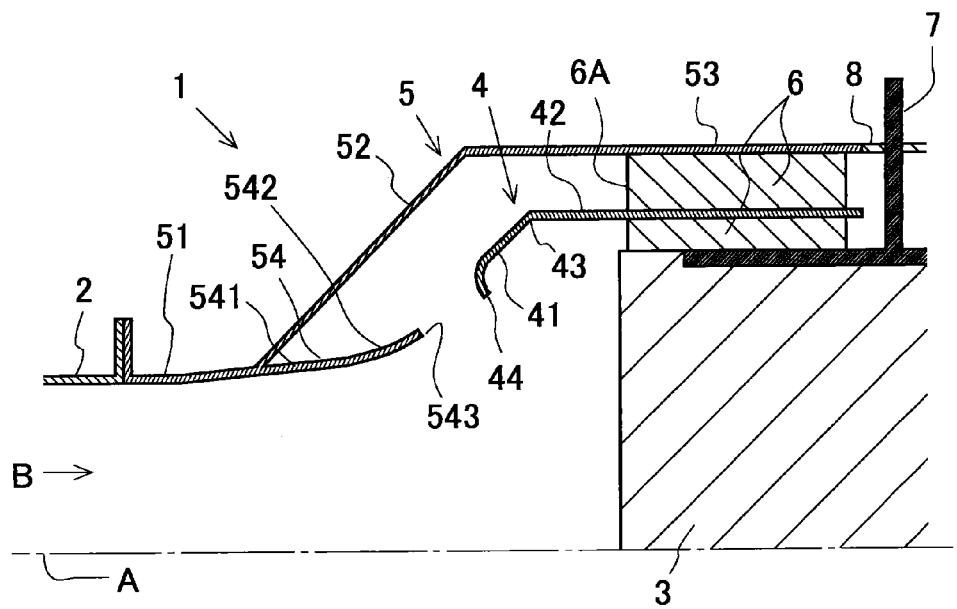
FIG. 3 shows a schematic arrangement of an electrically heated catalyst according to a second embodiment.

FIG. 3 shows a schematic arrangement of EHC 1 according to this embodiment. An explanation will be made about the features different from those of the first embodiment. In the first embodiment, the upstream side end portion 44 of the inclined portion 41 of the inner tube 4 is curved in the direction to make approach to the inclined portion 52 of the case 5. However, in this embodiment, an upstream side end portion 44 of an inclined portion 41 of an inner tube 4 is curved in the direction to make separation from the inclined portion 52 of the case 5.

That is, in this embodiment, the curvature is provided so that the center of curvature exists inside the inner tube 4, in the vicinity of the upstream side end portion 44 of the inclined portion 41 of the inner tube 4. As for the inclined portion 41 of the inner tube 4, the cross-sectional area is decreased at positions nearer to the upstream side end portion 44. The distance from the inclined portion 52 of the case 5 is prolonged at positions nearer to the upstream side end portion 44. This situation can be also expressed such that the curvature is provided toward the inside of the inner tube 4. The upstream side end portion 44 of the inner tube 4 may be directed toward the catalyst carrier 3. That is, it is allowable to provide any portion at which the direction of the tangential line is perpendicular to the central axis A at the inclined portion 41 of the inner tube 4. As for the inclined portion 41 in the vicinity of the bent portion 43, the cross-sectional area may be decreased at a certain degree or rate at positions disposed on the more upstream side. The degree or rate, at which the cross-sectional area is decreased, may be increased at positions disposed on the more upstream side, as in the vicinity of the upstream side end portion 44.

Figure 4:
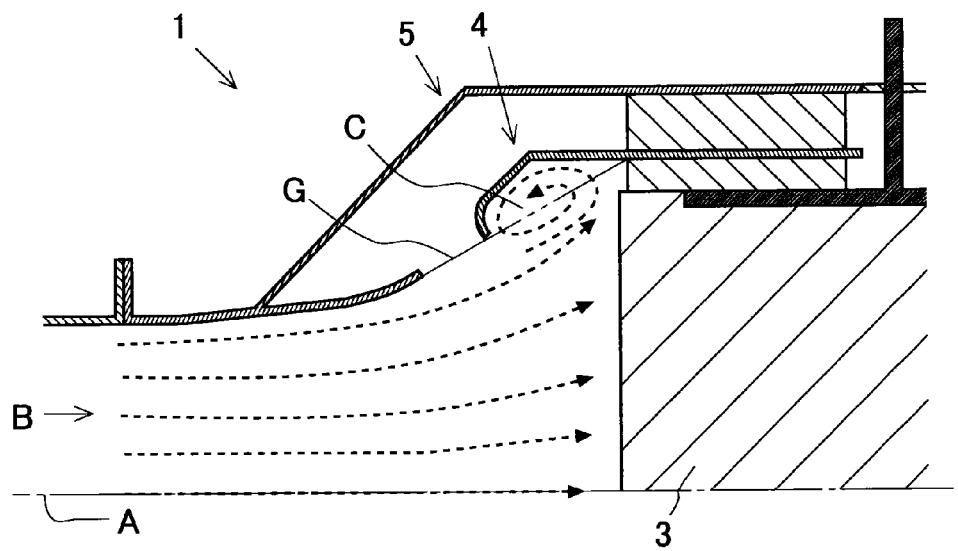
FIG. 4 shows the flow of exhaust gas according to the second embodiment.

In this context, FIG. 4 shows the flow of exhaust gas according to this embodiment. The flow direction of the exhaust gas is indicated by the broken line arrows. In this embodiment, the introducing portion 54 and the inclined portion 41 of the inner tube 4 are formed so that the upstream side end portion 44 of the inner tube 4 is positioned outside the line G which connects the downstream side end portion 543 of the introducing portion 54 and the outer circumference of the upstream side end portion 6A of the mat 6 provided inside the inner tube 4. Accordingly, it is possible to suppress the exhaust gas from flowing into the space between the inner tube 4 and the case 5. The introducing portion 54 and the inclined portion 41 of the inner tube 4 may be formed so that the upstream side end portion 44 of the inner tube 4 is positioned outside the line which connects the downstream side end portion 543 of the introducing portion 54 and the upstream side end portion of the outer circumference of the catalyst carrier 3.

In EHC 1 constructed as described above, the exhaust gas, which flows into the case 5 from the downstream side end portion 543 of the introducing portion 54, is diffused so that the exhaust gas is separated from the central axis A. However, when the distance, which ranges from the downstream side end portion 543 of the introducing portion 54 to the catalyst carrier 3, is relatively short, the exhaust gas is hardly diffused. In this case, the exhaust gas, which inflows from the downstream side end portion 543 of the introducing portion 54, is suppressed from being diffused toward the inner tube 4. Therefore, it is possible to suppress the exhaust gas from flowing to the outside of the upstream side end portion 44 of the inner tube 4.

Further, the upstream side end portion 44 of the inner tube 4 is bent toward the central axis A. Therefore, when the exhaust gas, which collides with the catalyst carrier 3 to cause the counterflow, flows in the vicinity of the upstream side end portion 44, the turbulence or vortex, which is in the direction shown in FIG. 4, tends to appear. That is, the turbulence or vortex is generated in the space C between the catalyst carrier 3 and the inclined portion 41 of the inner tube 4. Further, the exhaust gas, which flows from the downstream side end portion 543 of the introducing portion 54, can be suppressed from flowing along the inclined portion 41 of the inner tube 4. Accordingly, the turbulence or vortex tends to be generated in the space C between the catalyst carrier 3 and the inclined portion 41 of the inner tube 4. Owing to the features as described above, it is also possible to suppress the exhaust gas from flowing into the space between the inner tube 4 and the case 5.

Figure 5:
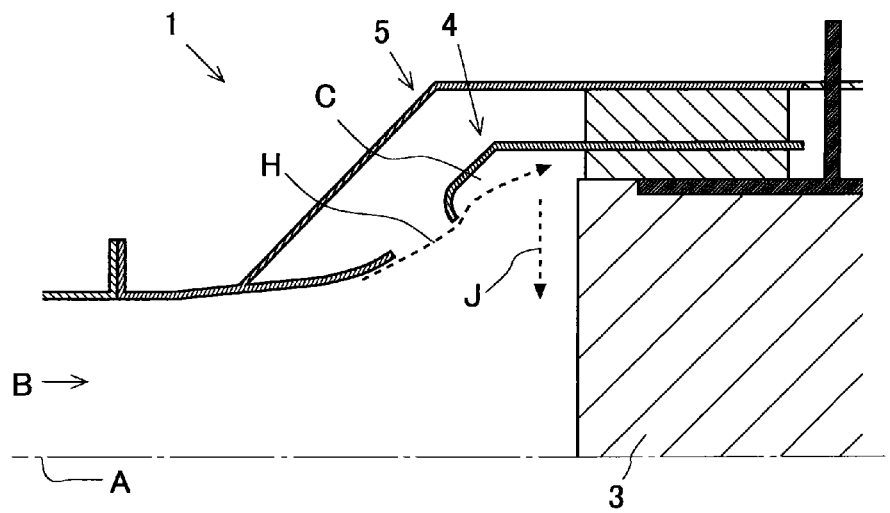
FIG. 5 alternatively shows the flow of exhaust gas according to the second embodiment.

Further, as shown in FIG. 5, it is also assumed that the turbulence or vortex is not generated at the inside of the inclined portion 41 of the inner tube 4. In this context, FIG. 5 alternatively shows the flow of exhaust gas according to this embodiment. When the exhaust gas flows from the upstream side to the downstream side along the inner circumferential surface of the tubular portion 42 of the inner tube 4 as shown by H, the turbulence or vortex is hardly generated in the space C between the catalyst carrier 3 and the inclined portion 41 of the inner tube 4. However, the density of the exhaust gas is raised in the vicinity of the inner circumferential surface of the tubular portion 42 of the inner tube 4. Therefore, as shown by J, the exhaust gas flows in the direction directed to the central axis A at the upstream side end surface of the catalyst carrier 3. Accordingly, it is possible to suppress the exhaust gas from flowing into the space between the inner tube 4 and the case 5.

As explained above, in this embodiment, it is possible to decrease the amount of the exhaust gas allowed to flow between the inner tube 4 and the case 5. Therefore, it is possible to suppress the adhesion of PM between the inner tube 4 and the case 5. Accordingly, it is possible to suppress the electricity from flowing through PM.

First Reference Embodiment

Figure 6:
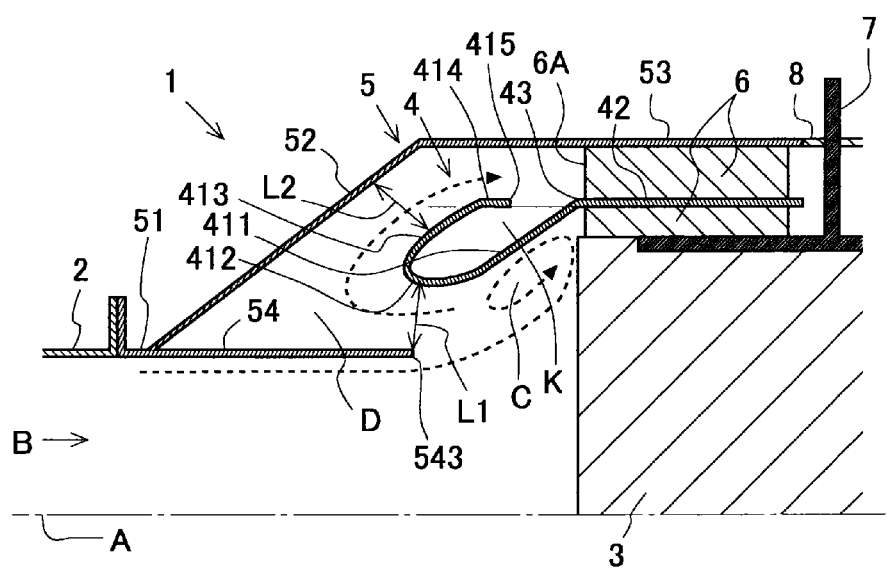
FIG. 6 shows a schematic arrangement of an electrically heated catalyst according to a first reference embodiment.

FIG. 6 shows a schematic arrangement of EHC 1 according to this reference embodiment. An explanation will be made about the features different from those of the first embodiment. In FIG. 6, broken lines indicate the flow of the exhaust gas.

In this reference embodiment, EHC 1 is constructed to include a downstream side inclined portion 411 in which the cross-sectional area is decreased at positions disposed on the more upstream side from the bent portion 43 of the inner tube 4, a curved portion 412 which is bent from the downstream side inclined portion toward the upstream side to change the direction by 180 degrees, an upstream side inclined portion 413 which extends outwardly toward the downstream side from the curved portion 412, and a folded back portion 414 which extends in parallel to the central axis A from the upstream side inclined portion 413 toward the downstream side. The downstream side end portion of the folded back portion 414 is designated as an end portion 415 of the inner tube 4.

In this case, the downstream side inclined portion 411 and the upstream side inclined portion 413 may be formed so that they are parallel to one another. In this embodiment, the folded back portion 414 is positioned on the extension line of the tubular portion 42 of the inner tube 4.

That is, the inner tube 4 according to this reference embodiment is constructed such that the cross-sectional area is gradually decreased toward the upstream side at the downstream side inclined portion 411, the inner tube 4 is thereafter bent outwardly at the curved portion 412, and the inner tube 4 extends outwardly toward the downstream side at the upstream side inclined portion 413. A distance is provided between the bent portion 43 and the end portion 415 of the inner tube 4.

A space K, which is surrounded by the downstream side inclined portion 411, the curved portion 412, and the upstream side inclined portion 413 and which is open between the bent portion 43 and the end portion 415 of the inner tube 4, is formed for the inner tube 4 constructed as described above.

The introducing portion 54 is formed so that the introducing portion 54 is a tube parallel to the central axis A. The distance L1 between the inner tube 4 and the downstream side end portion 543 of the introducing portion 54 is prolonged, and the distance L2 between the inner tube 4 and the inclined portion 52 of the case 5 is prolonged, as compared with the first embodiment. The introducing portion 54 may be curved in the same manner as in the first embodiment.

Further, the bent portion 43 of the inner tube 4 is provided in the vicinity of the upstream side end portion 6A of the mat 6.

In the case of EHC 1 constructed as described above, it is easy to manage the dispersion in production, owing to the enlarged distance between the inner tube 4 and the case 5. However, the exhaust gas tends to flow into the space between the inner tube 4 and the case 5, and hence PM tends to adhere.

On the other hand, the exhaust gas hardly flows into the space K, owing to the fact that the inner tube 4 is bent by 180 degrees at the curved portion 412. Therefore, PM hardly adheres to the wall surface for forming the space K, and hence it is possible to secure the insulation performance.

The cross-sectional area of the introducing portion 54 is not changed, and hence the introducing portion 54 can be attached afterward even after the case 5 is assembled. Accordingly, it is easy to manage the dispersion in production.

Further, the areal size, which confronts the catalyst carrier 3, is reduced in relation to the inner tube 4. Therefore, it is possible to suppress the decrease in the temperature of the exhaust gas. Accordingly, it is possible to facilitate the increase in the temperature of the catalyst carrier 3.

The bent portion 43 of the inner tube 4 is provided in the vicinity of the mat 6, and hence the distance is shortened between the catalyst carrier 3 and the downstream side inclined portion 411 of the inner tube 4. Therefore, it is possible to raise the temperature of the inner tube 4. Accordingly, it is possible to facilitate the oxidation of PM adhered to the inner tube 4.

Second Reference Embodiment

Figure 7:
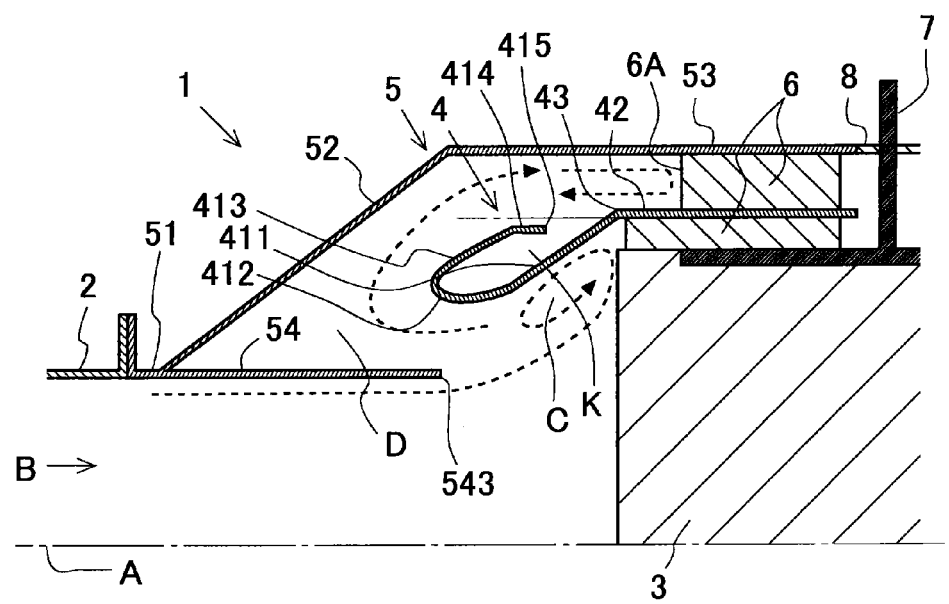
FIG. 7 shows a schematic arrangement of an electrically heated catalyst according to a second reference embodiment.

FIG. 7 shows a schematic arrangement of EHC 1 according to this reference embodiment. An explanation will be made about the features different from those of the first reference embodiment. In FIG. 7, broken lines indicate the flow of the exhaust gas.

EHC 1 according to this reference embodiment is different from that of the first reference embodiment in that a folded back portion 414 is positioned nearer to the central axis A as compared with the extension line of the tubular portion 42 of the inner tube 4. That is, an upstream side inclined portion 413 does not arrive at the extension line of the tubular portion 42 of the inner tube 4. Further, the folded back portion 414 extends toward the downstream side in parallel to the central axis A at the position disposed in front of the extension line of the tubular portion 42 of the inner tube 4.

Further, a bent portion 43 of the inner tube 4 is provided separately from the mat 6 disposed outside the inner tube 4.

In the case of EHC 1 constructed as described above, the exhaust gas, which flows into the space between the inner tube 4 and the case 5, flows toward the downstream side along the wall surface of the case 5, and the exhaust gas arrives at the mat 6. The exhaust gas, which collides with the mat 6, flows toward the upstream side along the outer circumferential surface of the tubular portion 42 of the inner tube 4. In this situation, the end portion 415 of the inner tube 4 is positioned nearer to the central axis A as compared with the extension line of the tubular portion 42 of the inner tube 4. Therefore, the exhaust gas does not flow into the space K. The exhaust gas passes along the outside of the end portion 415 of the inner tube 4, and the exhaust gas flows in the wall surface direction of the inclined portion 52 of the case 5. Therefore, it is possible to suppress the inflow of the exhaust gas into the space K, and hence it is possible to suppress the inflow of PM into the space K. Therefore, PM hardly adheres to the wall surface disposed around the space K, and hence it is possible to secure the insulation performance.

PARTS LIST

1: electrically heated catalyst (EHC), 2: exhaust tube, 3: catalyst carrier, 4: inner tube, 5: case, 6: mat, 6A: upstream side end portion, 7: electrode, 8: insulating portion, 41: inclined portion, 42: tubular portion, 43: bent portion, 44: upstream side end portion, 51: inlet portion, 52: inclined portion, 53: tubular portion, 54: introducing portion.

The invention claimed is:

1. An electrically heated catalyst comprising: a heat generating element which generates heat by applying electricity; a case which accommodates the heat generating element; a mat which is provided between the case and the heat generating element and which supports the heat generating element; and an inner tube which is interposed by the mat, which protrudes from the mat toward an upstream side and a downstream side of a flow of exhaust gas, and which insulates the electricity, wherein: the case includes a tubular portion which is provided on an outer circumferential side of the heat generating element and which is formed in parallel to a central axis of the heat generating element, an inlet portion which is provided on the upstream side from the tubular portion and which has an inner diameter smaller than that of the tubular portion, an inclined portion which connects the tubular portion and the inlet portion and which has cross-sectional areas that are increased toward the downstream side, and an introducing portion which extends from a connected portion between the inlet portion and the inclined portion toward inside of the case; the introducing portion is curved so that a center of curvature is positioned outside the introducing portion; the inner tube includes a tubular portion which is provided on an outer circumferential side of the heat generating element and which is formed in parallel to a central axis of the heat generating element, and an inclined portion which is provided on the upstream side from the tubular portion and which has inner diameters that are decreased toward the upstream side; a distance that allows exhaust gas to flow through the distance is provided between the introducing portion and the inclined portion of the inner tube; and the inclined portion of the inner tube is curved.

2. The electrically heated catalyst according to claim 1, wherein the inclined portion of the inner tube is curved so that a center of curvature is positioned outside the inclined portion.

3. The electrically heated catalyst according to claim 2, wherein an upstream side end portion of the inclined portion of the inner tube is positioned outside a tangential line provided at a downstream side end portion of the introducing tube.

4. The electrically heated catalyst according to claim 1, wherein the inclined portion of the inner tube is curved so that a center of curvature is positioned inside the inclined portion.

5. The electrically heated catalyst according to claim 4, wherein an end portion of the inclined portion of the inner tube is positioned outside a line which connects a downstream side end portion of the introducing tube and an outer circumference of the mat provided inside the inner tube.

* * * * *